United States Patent
Christensen et al.

(10) Patent No.: US 9,550,564 B2
(45) Date of Patent: *Jan. 24, 2017

(54) AIRCRAFT WHEEL DRIVING SYSTEM

(71) Applicant: HONEYWELL INTERNATIONAL INC., Morristown, NJ (US)

(72) Inventors: Donald Jeffrey Christensen, Phoenix, AZ (US); Robert Mitchell, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 229 days.

This patent is subject to a terminal disclaimer.

(21) Appl. No.: 14/183,959

(22) Filed: Feb. 19, 2014

(65) Prior Publication Data

US 2015/0232173 A1 Aug. 20, 2015

(51) Int. Cl.
*B64C 25/40* (2006.01)

(52) U.S. Cl.
CPC .................................. *B64C 25/405* (2013.01)

(58) Field of Classification Search
CPC ........ B64C 25/405; B64C 25/40; F16D 11/16; F16D 2011/008; F16D 41/12; F16D 41/125; F16D 41/14; F16D 41/16
See application file for complete search history.

(56) References Cited

U.S. PATENT DOCUMENTS

| | | | |
|---|---|---|---|
| 4,321,827 A | 3/1982 | Anderson | |
| 5,806,794 A | 9/1998 | Hrusch et al. | |
| 6,065,576 A * | 5/2000 | Shaw | F16D 41/125 |
| | | | 192/45.1 |
| 7,390,067 B2 | 6/2008 | Tong et al. | |
| 7,766,790 B2 * | 8/2010 | Stevenson | B60K 6/365 |
| | | | 192/43.1 |
| 7,791,358 B2 | 9/2010 | Annichiarico et al. | |
| 7,811,309 B2 | 10/2010 | Timm et al. | |
| 8,042,669 B2 * | 10/2011 | Samie | F16D 41/12 |
| | | | 192/43.1 |

(Continued)

FOREIGN PATENT DOCUMENTS

| | | |
|---|---|---|
| EP | 2524816 A1 | 11/2012 |
| EP | 2639160 A2 | 9/2013 |
| WO | 2014023941 A1 | 2/2014 |

OTHER PUBLICATIONS

European Search Report in EP Application No. 15154043.2 dated Jun. 25, 2015.

*Primary Examiner* — Philip J Bonzell
*Assistant Examiner* — Michael Kreiner
(74) *Attorney, Agent, or Firm* — Shimokaji IP (57) ABSTRACT

An electric taxi system (ETS) for an aircraft may include an electric motor positioned on a landing gear assembly of the aircraft; and one or more selectively operable engaging members for selectively coupling the ETS with a wheel of the aircraft. The engaging members may be drivably coupled to the electric motor. The engaging members may each have a base member and a leading end. An axis of the base member and an axis of the leading end may be in straight-line alignment upon initial engagement of the engaging member with the wheel. The axes of the leading end and the base member may displaced from a straight-line alignment responsively to lateral forces exerted on the leading end resulting from deflections of the wheel during taxiing of the aircraft.

18 Claims, 12 Drawing Sheets

(56) References Cited

U.S. PATENT DOCUMENTS

| | | | | |
|---|---|---|---|---|
| 8,079,453 | B2* | 12/2011 | Kimes | F16D 41/125 |
| | | | | 192/43.1 |
| 8,083,042 | B2* | 12/2011 | Samie | F16D 41/125 |
| | | | | 192/43.1 |
| 8,276,725 | B2* | 10/2012 | Swales | F16D 27/118 |
| | | | | 192/43.1 |
| 8,562,242 | B2 | 10/2013 | Murgatroyd et al. | |
| 8,844,693 | B2* | 9/2014 | Pawley | F16D 41/125 |
| | | | | 192/104 B |
| 9,121,454 | B2* | 9/2015 | Pawley | F16D 11/16 |
| 2006/0048402 | A1 | 3/2006 | Haimer | |
| 2011/0297500 | A1* | 12/2011 | Shaw | F16D 41/12 |
| | | | | 192/46 |
| 2012/0103747 | A1* | 5/2012 | Bird | F16D 41/14 |
| | | | | 192/46 |
| 2012/0126053 | A1 | 5/2012 | Christensen et al. | |
| 2014/0326566 | A1* | 11/2014 | Lindemann | F16D 41/12 |
| | | | | 192/45.1 |
| 2014/0332622 | A1* | 11/2014 | Charles | B64C 25/405 |
| | | | | 244/50 |
| 2015/0204397 | A1* | 7/2015 | Edelson | B64C 25/405 |
| | | | | 192/41 A |
| 2015/0217861 | A1* | 8/2015 | Cox | B64C 25/405 |
| | | | | 301/6.2 |
| 2015/0323019 | A1* | 11/2015 | Bedarrides | B64C 25/405 |
| | | | | 244/50 |

* cited by examiner

AIRCRAFT WHEEL DRIVING SYSTEM

BACKGROUND OF THE INVENTION

The present invention generally relates to taxi drive systems and more particularly, systems for transmitting torque to wheels of an aircraft.

A typical aircraft may taxi to and from runways with thrust force developed by its engines. A significant amount of fuel may be burned by the engines during a typical aircraft taxi profile before and after each flight. In many cases, the main engines may provide more motive force than is required to complete a successful taxi profile. In that regard, engine-thrust taxiing may be considered inefficient and may contribute to high fuel costs and ground level emissions.

Aircraft designers have sought a more efficient method for propelling an aircraft during taxiing. Electric taxi systems (ETS) have been proposed to provide higher efficiency. An ETS may be implemented by using electrical motors to provide the motive force for aircraft taxiing. While this general ETS concept holds promise for improved efficiency, there are practical application problems that need to be addressed in any successful ETS design. For example, it is desirable that an ETS should be selectively engageable with wheels of the aircraft so that the ETS does not impact normal take-off and landing procedures or aircraft performance. It is also desirable to construct an ETS with compact and lightweight components which may be retrofitted onto existing aircraft and may perform reliably even when exposed to varying environmental conditions that may be encountered by the aircraft at various airports.

The wheel rims of many commercial aircraft are designed to allow a limited amount of deflection during taxiing and turning of the aircraft. For example, during taxiing, the load of the aircraft may cause the wheel to ovalize on each revolution. Moreover, the loads exerted on the wheel may cause deflections of the wheel rim with respect to the axle. For example, weight on the axle during a turn may cause flexure of the wheel rim radially or axially from the drive element as the drive element may not want to flex with the load forces.

Such deflections can be reduced by making aircraft wheels more stiff. But, wheel designs which allow for such deflections have been found to be less likely to experience metal fatigue failures. However, wheel deflections may present difficulties to designers of an ETS. The combination of wheel ovalization and axial deflections caused by wheel side load conditions and axle bending may compromise the structural integrity in the interface between the ETS drive and the wheel. For example, point loading of forces on drive elements may lead to wear issues over time, expediting failure of the connection between the ETS and the wheel.

As can be seen, there is a need for a system in which an ETS drive may be reliably coupled to an aircraft wheel to transmit torque to the wheel. More particularly, there is a need for an ETS coupling system in which point loading of drive elements does not produce undesirable wear of the drive elements.

SUMMARY OF THE INVENTION

In one aspect of the present invention, an electric taxi system (ETS) for an aircraft may comprise an electric motor positioned on a landing gear assembly of the aircraft; and one or more selectively operable engaging members for selectively coupling the ETS with a wheel of the aircraft, the one or more engaging members being drivably coupled to the electric motor, and the one or more selectively operable engaging members each having a base member and a leading end, wherein an axis of the base member and an axis of the leading end are in straight-line alignment upon initial engagement of the engaging member with the wheel, and wherein, the axes of the leading end and the base member are displaced from a straight-line alignment responsively to lateral forces exerted on the leading end resulting from deflections of the wheel during taxiing of the aircraft.

In another aspect of the present invention, apparatus for selectively engaging an electric taxi system (ETS) with a wheel of an aircraft, the apparatus may comprise one or more engaging members drivably coupled to an electric motor of the ETS, the one or more engaging members having a conically shaped leading end; and a wheel-drive device attached to a wheel of the aircraft, the wheel-drive device including a conical socket positioned to be engageable with the leading end of an engaging member of one of the engaging assemblies when the engaging member is extended outwardly.

In still another aspect of the present invention, apparatus for selectively engaging an ETS with a wheel of an aircraft may comprise an annular engaging ring positioned in an annular space between a rim of the wheel and a brake piston assembly, the engaging ring being rotatably coupled to an electric motor of the ETS; a first and a second spring-biased engaging member coupled to the engaging ring and positioned in the annular space, wherein each of the engaging members includes a base member and a leading end flexibly attached to one another.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Figure 1:
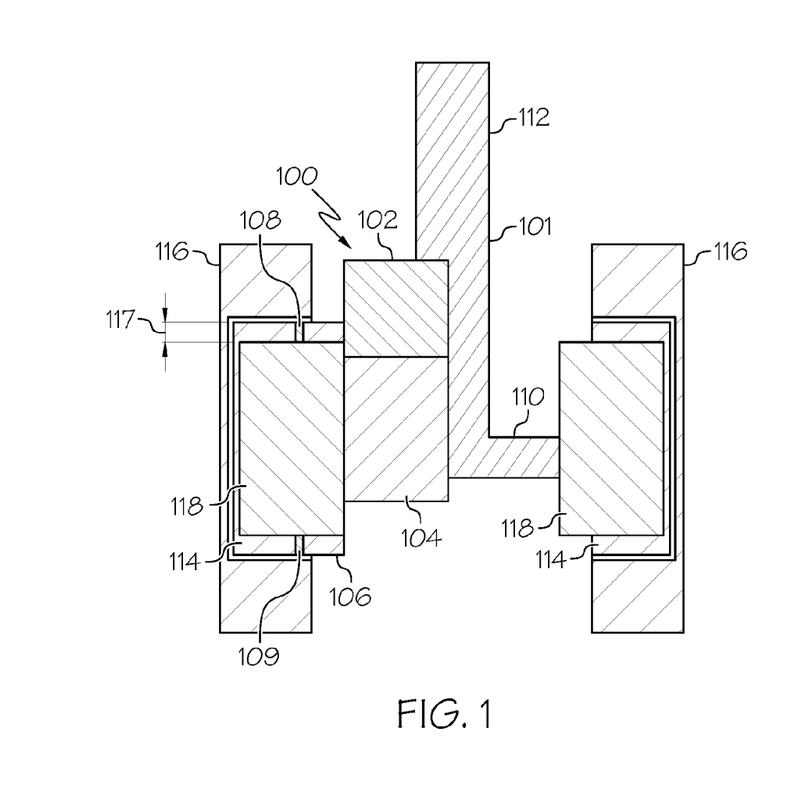
FIG. 1 is a schematic diagram of an electric taxi system (ETS) in accordance with an exemplary embodiment of the invention.

Broadly, embodiments of the present invention generally provide an apparatus and system to reliably transmit torque to an aircraft wheel while accommodating deflection of a wheel on an axle. Aspects of the subject technology may be useful in aircraft landing gear systems during taxiing of the aircraft Referring now to FIG. 1, an exemplary embodiment of an ETS 100, which may be installed on a landing gear assembly 101 of an aircraft, is shown in schematic form. The ETS 100 may include an electric motor 102, an intermediate gearbox 104 coupled to the motor 102, an output gearbox 106 coupled with the gearbox 104 and engagement assemblies 108 and 109. The ETS 100 may be installed on a conventional aircraft landing gear assembly 101 which may include a main strut 112, an axle 110, wheels 114, tires 116 and brake piston assemblies 118. Advantageously, components of the ETS 100 may be installed onto the landing gear assembly 101 with little or no modification of the components of the landing gear assembly 101. Thus the ETS 100 may be suitable for being retrofitted onto main landing gear of existing aircraft. Additionally, the ETS 100 may be retrofitted into nose landing gear which may or may not be fitted with brake assemblies.

Figure 2:
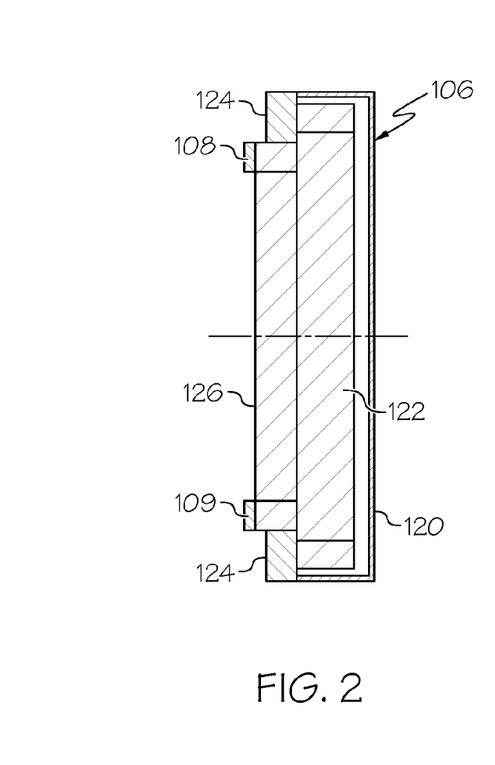
FIG. 2 is a schematic sectional view of an output gearbox and engaging assemblies of FIG. 1 in accordance with an exemplary embodiment of the invention.
Figure 3:
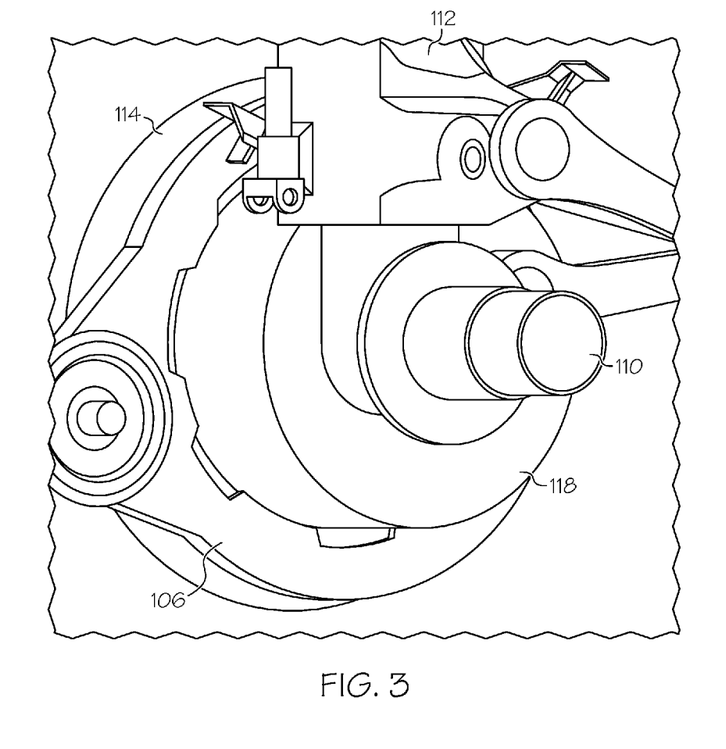
FIG. 3 is a perspective view of the output gearbox of FIG. 1 in accordance with an exemplary embodiment of the invention.
Figure 4:
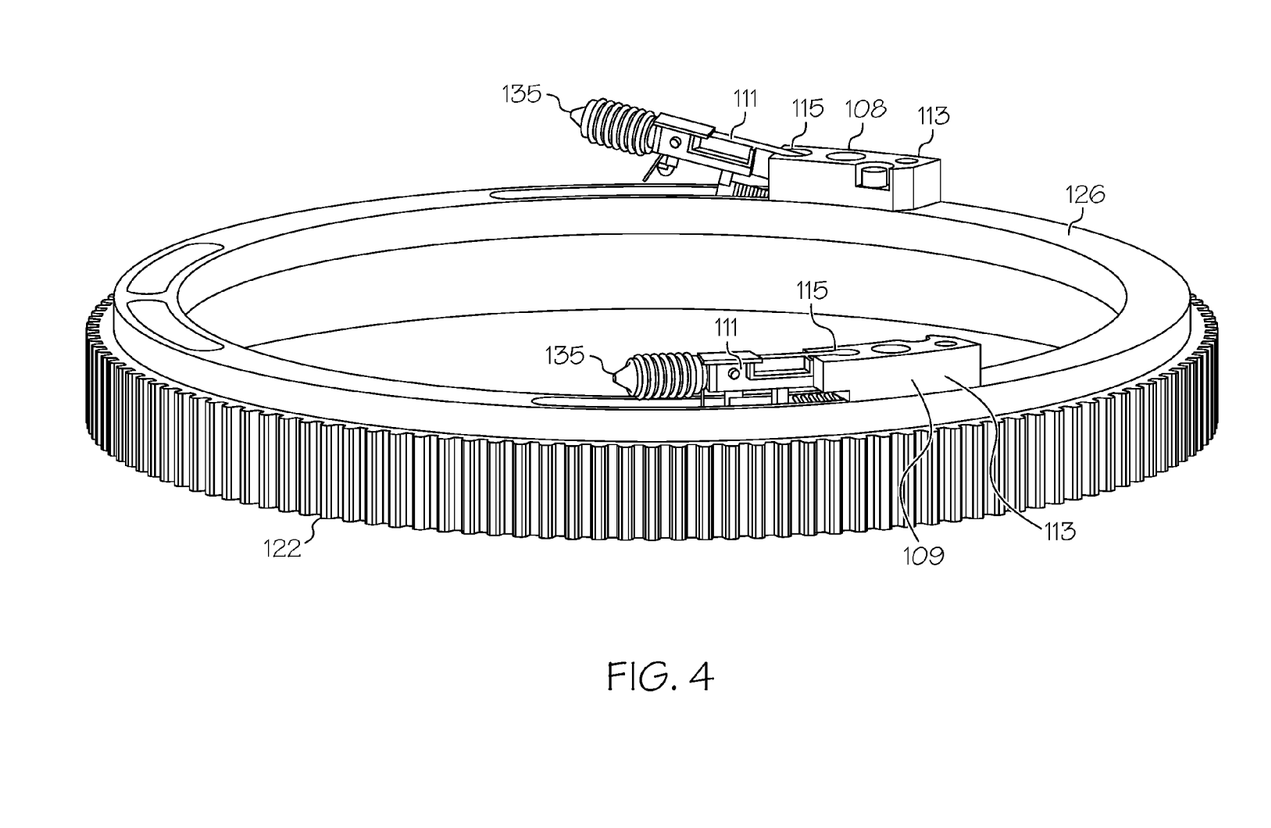
FIG. 4 is a perspective view of an output gear and engaging assemblies of FIG. 1 in accordance with an exemplary embodiment of the invention.

Referring now to FIGS. 2, 3 and 4, it may be seen that the output gearbox 106 may surround the brake piston assembly 118. The output gearbox 106 may include a housing 120 that may surround a pinion-driven output gear or ring gear 122. An engaging ring 126 may be coupled with the ring gear 122. The engaging ring 126 may be supported in the housing 120 on sealed bearings 124. Engaging assemblies 108 and 109 may be coupled with the engaging ring 126. Referring back to FIG. 1, it may be seen that the engaging assemblies 108 and 109 may be positioned radially inwardly of a rim of the wheel 114 and radially outwardly of the brake piston assembly 118. In other words, the engaging assemblies 108 and 109 may be positioned within an annular space 117 between the wheel 114 and the brake piston assembly 118.

In FIG. 4, one of the engaging assemblies, 108 is illustrated in a stowed or latched state and one of the engaging assemblies, 109, is shown in an axially extended state. Each of the engaging assemblies 108 and 109 may include an engaging member 111 and a base 113. The engaging member 111 may be coupled to the base 113 with a ball and socket connector 115.

Figure 5:
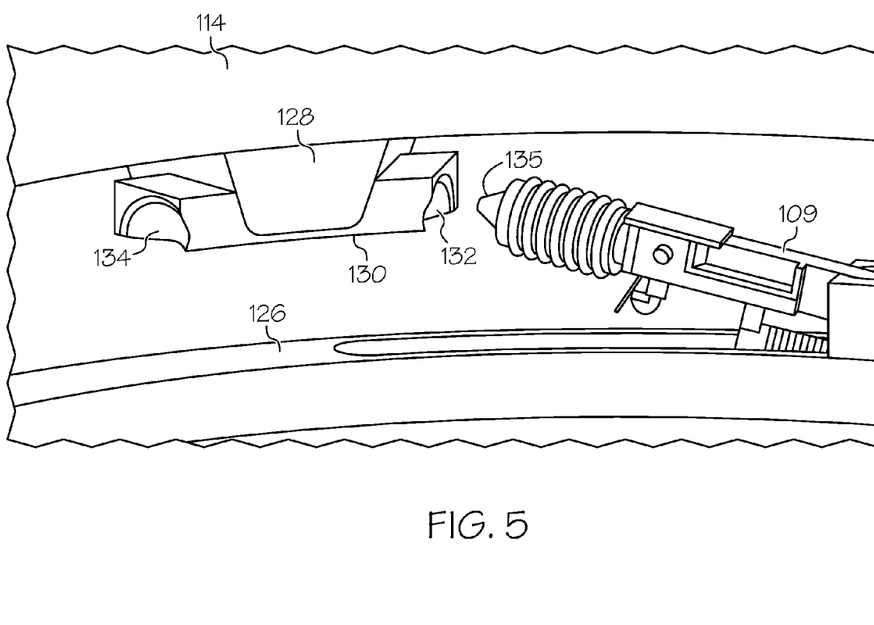
FIG. 5 is a perspective view of an engaging assembly and a wheel-drive device of FIG. 1 in accordance with an exemplary embodiment of the invention.

Referring now to FIG. 5, it may be seen that the wheel 114 may be provided with a driving lug 128. A wheel-drive device 130 may be coupled with the lug 128. The wheel-drive device 130 may be provided with a conical socket 132 oriented in a clockwise direction and a conical socket 134 oriented in a counterclockwise direction. In operation, one of the engaging assemblies 108 or 109, in an extended state, may engage with one of the conical sockets 132 or 134 when there is relative rotational motion between the wheel 114 and the engaging ring 126. In the configuration of FIG. 5, a leading end 135 of the engaging assembly 109, in an extended state, may engage with the socket 132 whenever the engaging ring 126 rotates in a counterclockwise direction faster than the wheel 114. After such engagement, the wheel 114 may be driven at the same rotational speed as the engaging ring 126. Conversely, a leading end 135 of the engaging assembly 108 may engage with the socket 134 when the engaging assembly 108 is in an extended state and when the engaging ring 126 rotates in a clockwise direction faster than the wheel 114. Thus the output gearbox 106 of FIG. 1 may drive the wheel 114 to taxi an aircraft in either a forward or reverse direction.

Figure 6:
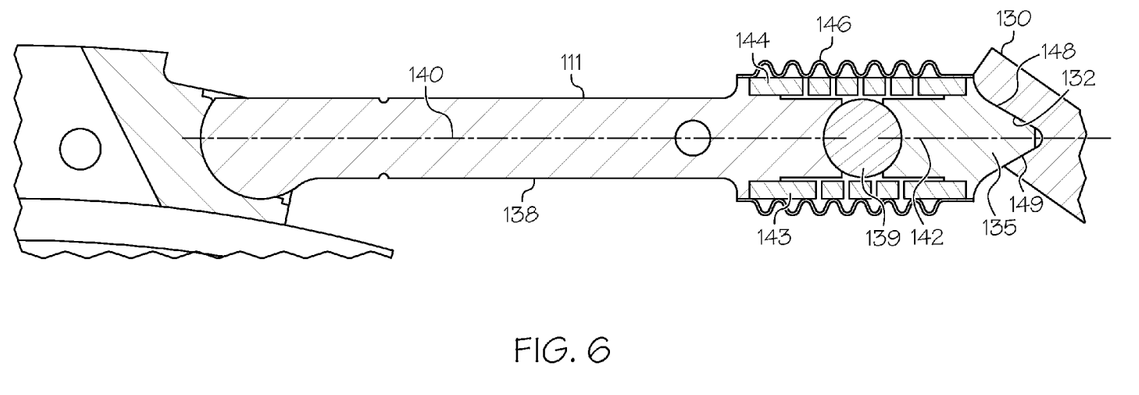
FIG. 6 is a cross-sectional view of a portion of an engaging assembly of FIG. 5 in accordance with an exemplary embodiment of the invention.

Referring now to FIG. 6, it may be seen that, in an exemplary embodiment, the engaging member 111 may include a base member 138 unto which the leading end 135 may be flexibly coupled through a ball and socket joint 139. The base member 138 may have an axis 140 and the conical leading end 135 may have an axis 142. A spring 144 may surround the ball and socket joint 139 and portions of the base member 138 as well as portions of the conical leading end 135. The spring 144 may have a natural tendency to maintain a straight cylindrical shape unless it is forced into a different configuration. Thus, in the absence of lateral forces acting on the leading end 135, the spring 144 may act to maintain the axes 140 and 142 in a straight-line alignment.

Figure 7:
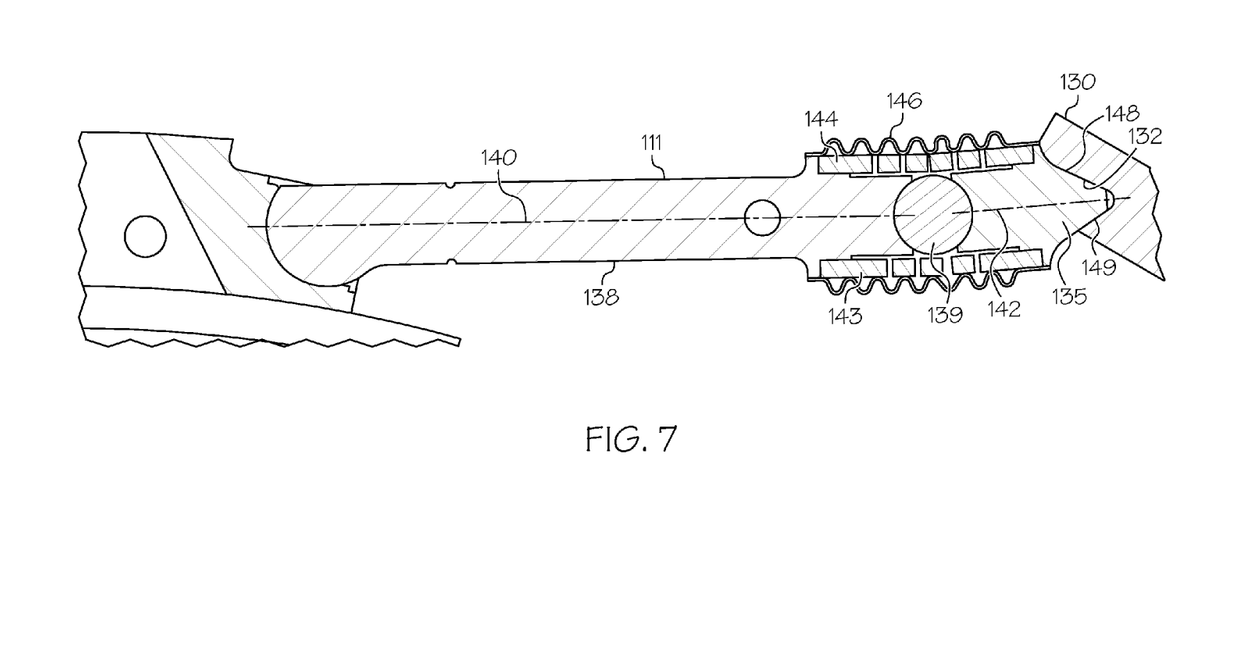
FIG. 7 is a cross-sectional view of the portion of the engaging assembly of FIG. 6 accordance with an exemplary embodiment of the invention.

Referring now to FIG. 7, it may be seen that, in the event that the wheel drive device 130 may be displaced as a result of defections of the wheel rim 114 or the tire 116 (FIG. 1), the leading end 135 may remain fully engaged with socket 132. The deflecting wheel drive device 130 may exert lateral forces on the leading end 135 and these forces may counteract the natural straightening effects exerted by the spring 144. Nevertheless, the leading end 135 may remain engaged with the drive device 130. Consequently the leading end 135 may swivel on the ball and socket joint 139. In that regard, the base member 138 and the leading end 135 may be considered to be flexibly attached to one another. It can be seen that any relative motion between the socket 132 and the base member 113 may be isolated to the ball and socket joint 139. Irrespective of alignment of the axes 140 and 142, the conical leading end 135 may not experience any motion relative to the socket 132. In other words, the conical shape of the leading end 135 and the conical socket 132 of the drive device 130 may result in these members remaining engaged with one another without any relative motion between them even though wheel deflections may produce lateral forces on the base member 113. Thus there may be no deleterious wearing of either the socket 132 or the leading end 135 due to wheel or tire deflection during taxiing. In order to assure that the leading end 135 does not move relatively to the socket 132, an included angle of an external face 148 of the leading end 135 should be no greater than about 120°. In other words, the face 148 may be configured so that is has an included angle, relative to the axis 142, no greater than about 60°. Similarly the socket 132 should be formed so that its internal face 149 may have an included angle no greater than about 120°. In other words the socket 132 may be provided with an internal face that is shaped to accommodate an external face of the leading end 135.

The ball and socket joint 139 may be enclosed within a bellows 146. The bellows 146 may be sealed and filled with lubricant 143. Thus the ball and socket joint 139 may be continuously lubricated as the leading end 135 and the base member 138 may move relative to one another. Such lubrication may reduce deleterious wear at the ball and socket joint 139 during swiveling of the ball and socket joint 139.

Figure 8:
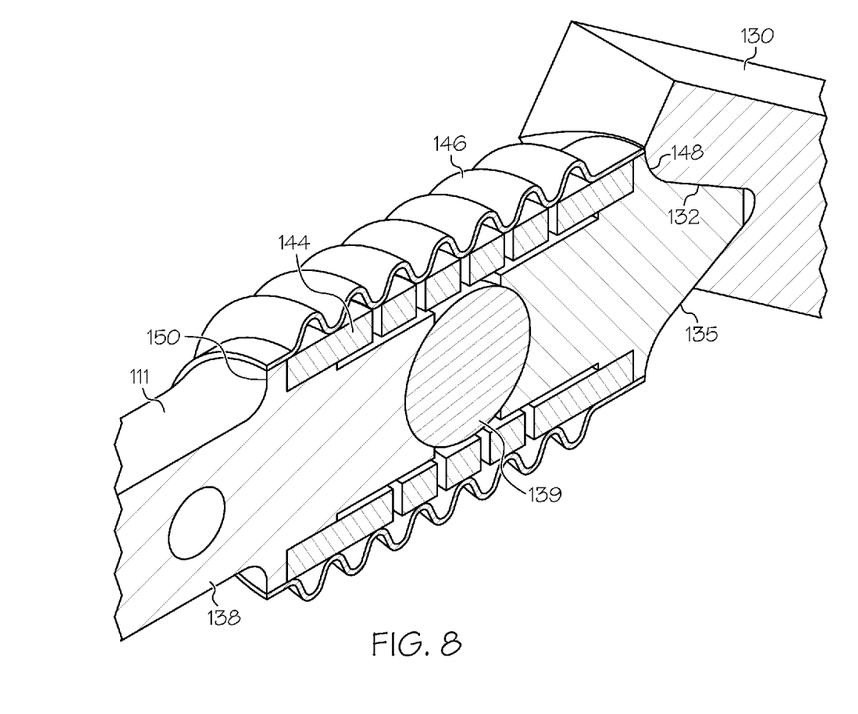
FIG. 8 is a detailed cross-sectional perspective view of a portion of the engaging assembly of FIG. 6 in accordance with an exemplary embodiment of the invention.

In FIG. 8, a more detailed view of the engaging member 111 is shown. The base member 138 may be provided with a circumferential shoulder 150 and the leading end 135 may be provided with a circumferential shoulder 152. In an exemplary embodiment the spring 114 may be a machined spring, for example, a spring that may be produced by machining a helical groove into a cylindrical metallic tube. The spring 144 may be welded or pinned to both of the shoulders 150 and 152. In an exemplary embodiment, the bellows 148 may be metallic and may be welded to the shoulders 150 and 152. In another exemplary embodiment, the bellows 148 may be constructed from an elastomeric material such as rubber. In that case, the bellows 148 may function as an environmental shield and may be clamped onto the shoulders 150 and 152 with conventional clamps (not shown).

Figure 9:
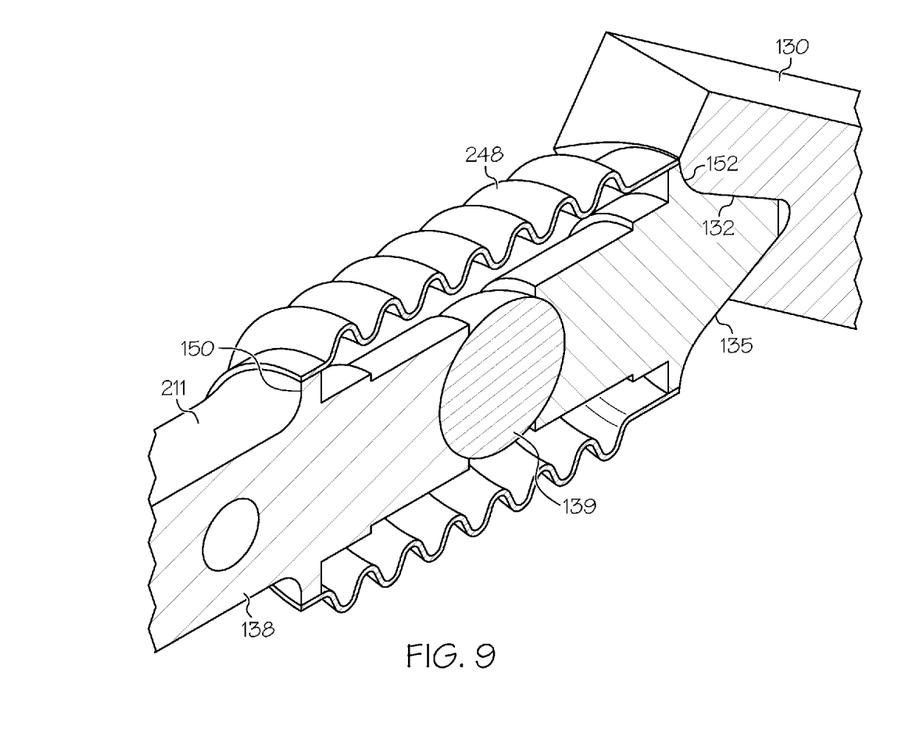
FIG. 9 is a detailed cross-sectional view of an engaging assembly in accordance with a second exemplary embodiment of the invention.

In FIG. 9, another exemplary embodiment of an engaging assembly 211 is illustrated. The engaging assembly 211 may be constructed so that only metallic bellows 248 provide requisite straightening force. In other words, the bellows 248 may perform both the straightening role of the spring 144 of FIG. 8 and a lubricant sealing role.

Figure 10:
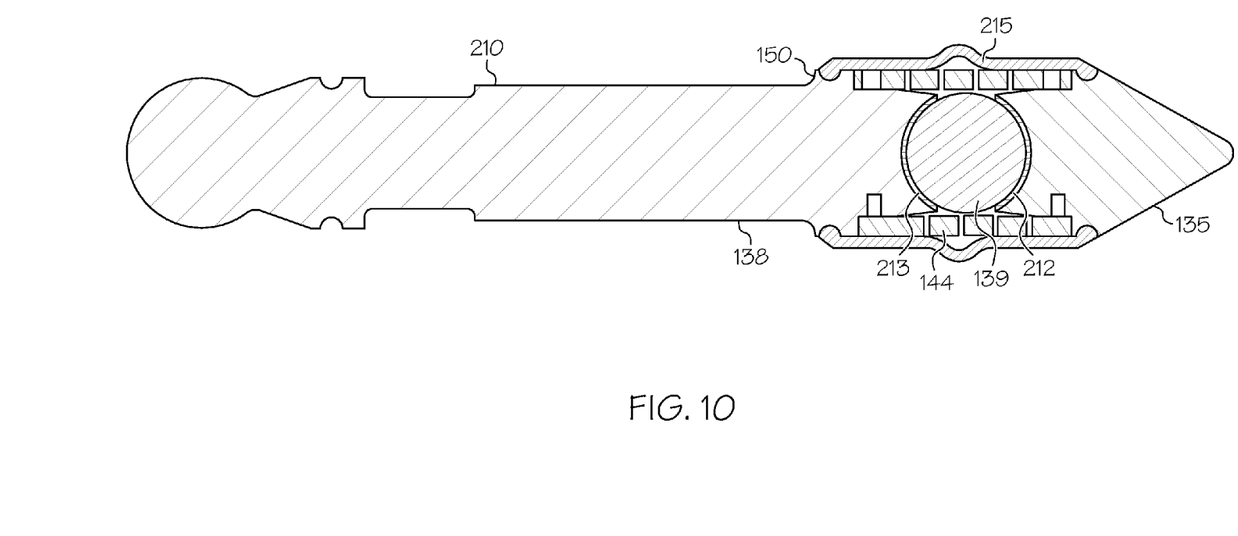
FIG. 10 is perspective view of a leading end of an engaging member in accordance with a third exemplary embodiment of the invention.

Referring now to FIG. 10, there is shown another exemplary embodiment of an engaging member 210 in which an elastomeric environmental shield 215 may surround the spring 144. The engaging member 210 may be provided with a hemispherical liner 212 interposed between the leading end 135 and the ball 139. Another liner 213 may be interposed between the ball 139 and the base member 138. The liners 212 and 213 may be impregnated with friction-reducing material such as polytetraflouride (PTFE).

Figures 11, 12:
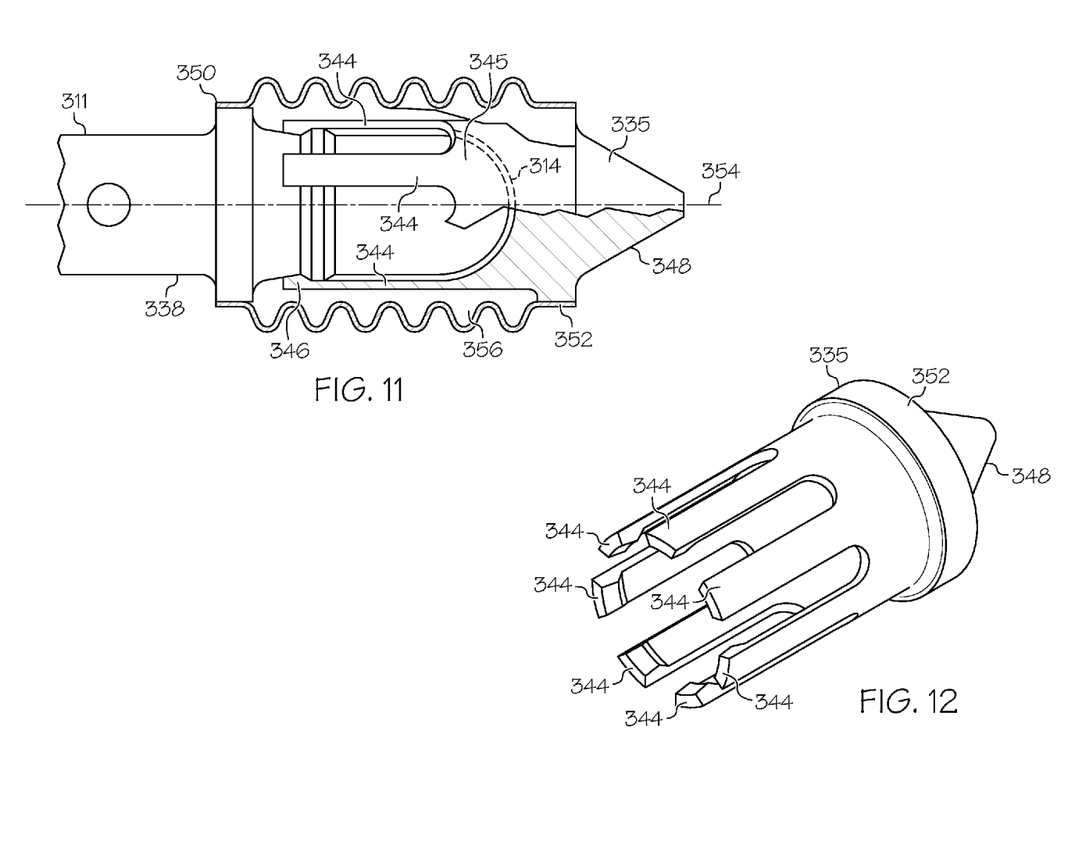
FIG. 11 is perspective view of a leading end of an engaging member in accordance with a fourth exemplary embodiment of the invention.
FIG. 12 is a cross sectional view of an assembled portion of an engaging member in accordance with the fourth exemplary embodiment of the invention.

Referring now to FIGS. 11 and 12, there is shown another exemplary embodiment of an engaging member 311. A leading end 335 may include leaf springs 344, a hemispherical pocket 314, a circumferential shoulder 352 and an external conical face 348. A base member 338 may include a circumferential shoulder 350, a hemispherical end 345 and a spring-engagement notch 346. In operation, the leaf springs 344 may exert a straightening force against the spring engagement notch 346 so that, in the absence of aircraft wheel deflection forces, an axis 354 may be maintained in a straight line. Under conditions in which the leading end 335 may be engaged with socket 132 (See FIG. 6) the leading end 336 may swivel on the base member 338 responsively to wheel deflection forces exerted on the conical face 348. In other words, the hemispherical pocket 314 may swivel around the hemispherical end 345. When such swiveling may occur, the leaf springs 344 may flex to accommodate the swiveling action. A bellows 356 may be attached to the shoulders 350 and 352 and may provide a lubricant sealing system for the engaging member 311.

Figure 13:
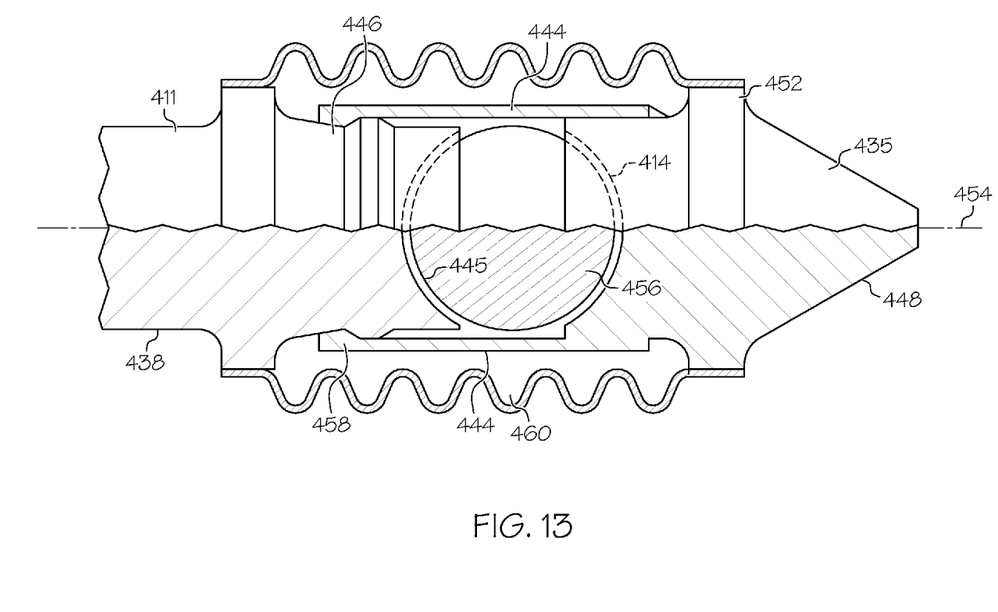
FIG. 13 is a cross sectional view of an assembled portion of an engaging member in accordance with a fifth exemplary embodiment of the invention.

Referring now to FIG. 13, there is shown another embodiment of an engaging member 411. A leading end 435 may include leaf springs 444, a ball pocket 414, a circumferential shoulder 452 and a conical face 448. A base member 438 may include a circumferential shoulder 450, a ball pocket 445 and a spring-engagement notch 446. In operation, the leaf springs 444 may exert a straightening force against the spring-engagement notch 446 so that, in the absence of aircraft wheel deflection forces, an axis 454 may be maintained in a straight line. Under conditions in which the leading end 435 may be engaged with socket 132 (See FIG. 6) the leading end 435 may swivel on a ball 456 responsively to wheel deflection forces exerted on the conical face 448. When such swiveling may occur, projections 458 of the leaf springs 344 may be forced out of the spring-engagement notch 446 to accommodate the swiveling action. A bellows 460 may be attached to the shoulders 450 and 452 and may provide a lubricant sealing system for the engaging member 411.

Figure 14:
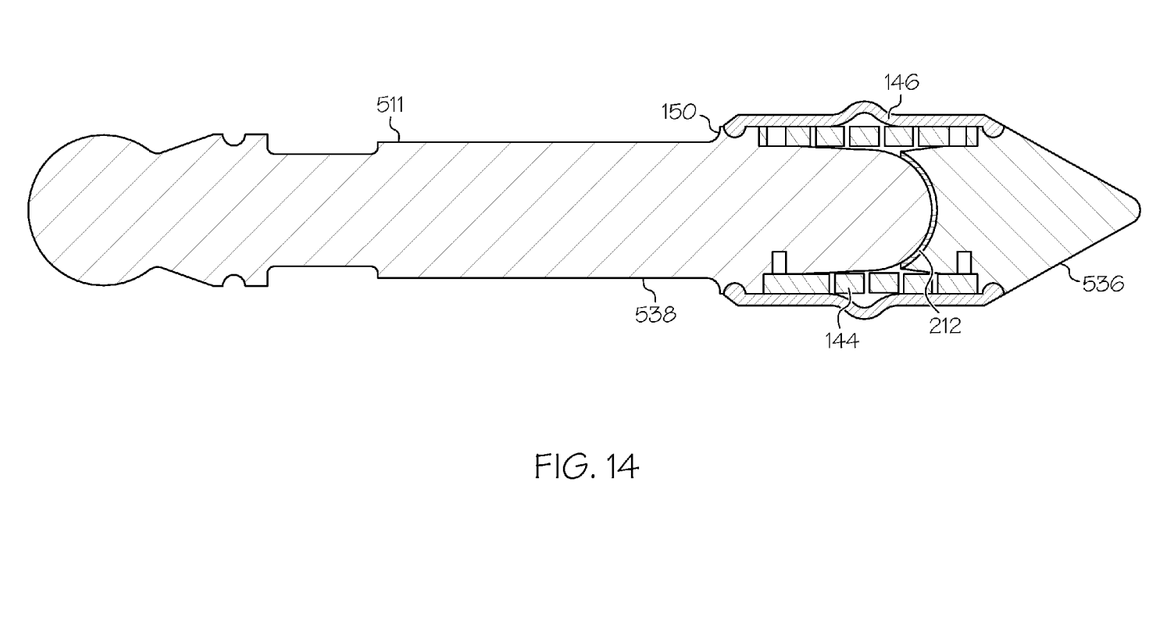
FIG. 14 is a cross-sectional view of an assembled portion of an engaging member in accordance with a sixth exemplary embodiment of the invention.

Referring now to FIG. 14, there is shown still another exemplary embodiment of an engaging member 511 in which an elastomeric environmental shield 215 may surround the spring 144. The engaging member 210 may be provided with a hemispherical liner 212 interposed between the leading end 536 and a hemispherical end 514 of a base member 538.

It should be understood, of course, that the foregoing relates to exemplary embodiments of the invention and that modifications may be made without departing from the spirit and scope of the invention as set forth in the following claims.

We claim:

1. An electric taxi system (ETS) for an aircraft comprising:
   an electric motor positioned on a landing gear assembly of the aircraft; and
   a selectively operable engaging member for selectively coupling the ETS with a wheel of the aircraft, the engaging member being drivably coupled to the electric motor, and the engaging member having a base member and a leading end,
   wherein the wheel of the aircraft includes a wheel-drive device having a socket with an internal face that is shaped to accommodate an external face of the leading end of the engaging member,
   wherein a ball and socket joint is interposed between the base member and the leading end so that
   axes of the leading end and the base member are displaceable from a straight-line alignment responsively to lateral forces exerted on the leading end resulting from deflections of the wheel during taxiing of the aircraft.

2. The ETS of claim 1 wherein the internal face of the socket and the external face of the leading end of the engaging member are conical.

3. The ETS of claim 2 wherein an included angle of the face of the socket is no greater than about 120°.

4. The ETS of claim 1 further comprising:
   a bellows surrounding the ball and socket joint; and
   lubricant surrounding the ball and socket joint.

5. The ETS of claim 1 further comprising hemispherical liners interposed in the ball and socket joint, the liners being impregnated with friction reducing material.

6. Apparatus for selectively engaging an electric taxi system (ETS) with a wheel of an aircraft, the apparatus comprising:
   an engaging assembly drivably coupled to an electric motor of the ETS, the engaging assembly having an engaging member with a conically shaped leading end; and a wheel-drive device attached to a wheel of the aircraft, the wheel-drive device including a conical socket positioned to be engageable with the leading end of the engaging member when engaging member is extended outwardly.

7. The apparatus of claim 6 wherein the engaging member further comprises:
a base member; and
a spring coupling the base member to the leading end.

8. The apparatus of claim 7:
wherein the spring surrounds a portion of the base member and a portion of the leading end, and
wherein the spring is configured to maintain an axis of the base member in straight-line alignment with an axis of the leading end in the absence of lateral forces acting on the leading end.

9. The apparatus of claim 8 wherein the spring is a cylindrical machined spring constructed as a hollow metallic tube with a helical groove machined therein.

10. The apparatus of claim 9:
wherein the base member has a circumferential shoulder;
wherein the leading end has a circumferential shoulder; and
wherein the spring is welded to both of the circumferential shoulders.

11. The apparatus of claim 6:
wherein the engaging assembly includes a base; and
wherein the engaging member is coupled to the base with a ball and socket connector.

12. Apparatus for selectively engaging an ETS with a wheel of an aircraft comprising:
a wheel rim:
a brake piston assembly;
an annular engaging ring positioned in an annular space between a rim of the wheel and a brake piston assembly, the engaging ring being rotatably coupled to an electric motor of the ETS;
a spring-biased engaging member coupled to the engaging ring and positioned in the annular space,
wherein the engaging member includes a base member and a leading end flexibly attached to the base member.

13. The apparatus of claim 12:
wherein the leading ends is provided with a leaf spring; and
wherein the leaf spring is engaged with a portion of the base member.

14. The apparatus of claim 13 wherein the leaf spring is engaged with a spring engagement notch of the base member.

15. The apparatus of claim 12:
wherein the leading end is provided with a hemispherical pocket;
wherein the base member is provided with a hemispherical end; and
wherein the leading end is joined together so that the hemispherical pockets and the hemispherical ends provide a swiveling connection.

16. The apparatus of claim 15 further comprising a bellows surrounding the hemispherical pocket, the hemispherical end and the leaf springs of the engaging member.

17. The apparatus of claim 12 further comprising a ball and socket joint interposed between the leading end and the base member.

18. The apparatus of claim 17 further comprising:
a bellows surrounding the ball and socket joint and the leaf spring; and
lubricant within the bellows.

* * * * *